United States Patent
Asare et al.

(10) Patent No.: US 10,761,824 B2
(45) Date of Patent: *Sep. 1, 2020

(54) SCRIPT GENERATION ENGINE AND MAPPING SEMANTIC MODELS FOR TARGET PLATFORM

(71) Applicant: International Business Machines Corporation, Armonk, NY (US)

(72) Inventors: Kwasi Addo Asare, Durham, NC (US); Attila Barta, Toronto (CA); Richard D. Huddleston, Newtonville, MA (US); Daniel Everett Jemiolo, Pascoag, RI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,055

(22) Filed: Feb. 27, 2019

(65) Prior Publication Data
US 2019/0196802 A1 Jun. 27, 2019

Related U.S. Application Data

(60) Continuation of application No. 15/610,569, filed on May 31, 2017, now Pat. No. 10,223,095, which is a (Continued)

(51) Int. Cl.
*G06F 9/44* (2018.01)
*G06F 8/61* (2018.01)
(Continued)

(52) U.S. Cl.
CPC .............. *G06F 8/61* (2013.01); *G06F 8/63* (2013.01); *G06F 8/76* (2013.01); *H04L 67/34* (2013.01)

(58) Field of Classification Search
USPC ........................................ 717/174
See application file for complete search history.

(56) References Cited

U.S. PATENT DOCUMENTS 5,339,430 A * 8/1994 Lundin ............... G06F 9/44521
719/332
5,564,044 A 10/1996 Pratt
(Continued)

*Primary Examiner* — Matthew J Brophy
(74) *Attorney, Agent, or Firm* — Christopher M. Pignato

(57) ABSTRACT

The present invention is an installation script generation engine. An application component distribution system can include a repository of semantic models for interdependent ones of application components. A mapping of individual listings in the semantic models to target platform specific installation instructions further can be included. Finally, a script generation engine can be configured to produce a target specific set of instructions for a specified application component based upon a mapping of at least one of the semantic models in the repository. Notably, each of the semantic models can include a listing of component relationships, target platform requirements and platform neutral installation instructions. Moreover, the component relationships can include at least one component relationship selected from the group consisting of a containment relationship, a usage relationship, a contradiction relationship, and an equivalence relationship. Finally, a Web services interface to the repository can be configured to permit remote access to the repository.

11 Claims, 3 Drawing Sheets

Related U.S. Application Data continuation of application No. 14/991,919, filed on Jan. 9, 2016, now Pat. No. 9,696,979, which is a continuation of application No. 13/763,935, filed on Feb. 11, 2013, now Pat. No. 9,256,415, which is a division of application No. 10/725,728, filed on Dec. 2, 2003, now Pat. No. 8,381,207.

(51) Int. Cl.
*G06F 8/76* (2018.01)
*H04L 29/08* (2006.01)

(56) References Cited

U.S. PATENT DOCUMENTS

| | | | | |
|---|---|---|---|---|
| 5,581,764 A * | 12/1996 | Fitzgerald | ............. | G06F 8/41 709/223 |
| 5,719,854 A * | 2/1998 | Choudhury | ............. | G06F 9/5027 370/231 |
| 5,872,809 A * | 2/1999 | Batruni | ............. | H04L 29/06 370/274 |
| 6,029,000 A * | 2/2000 | Woolsey | ............. | G06F 8/47 717/114 |
| 6,178,546 B1 * | 1/2001 | McIntyre | ............. | G06F 8/10 717/115 |
| 6,189,051 B1 * | 2/2001 | Oh | ............. | G06F 3/0605 709/203 |
| 6,202,207 B1 * | 3/2001 | Donohue | ............. | G06F 8/65 705/59 |
| 6,226,792 B1 * | 5/2001 | Goiffon | ............. | G06F 8/36 707/999.2 |
| 6,256,773 B1 * | 7/2001 | Bowman-Amuah | ............. | G06F 8/71 707/999.202 |
| 6,295,645 B1 * | 9/2001 | Brewer | ............. | G06F 9/44521 717/173 |
| 6,330,554 B1 | 12/2001 | Altschuler et al. | | |
| 6,367,073 B2 * | 4/2002 | Elledge | ............. | G06F 8/61 715/810 |
| 6,536,037 B1 * | 3/2003 | Guheen | ............. | G06F 8/71 703/2 |
| 6,681,391 B1 * | 1/2004 | Marino | ............. | G06F 8/61 711/133 |
| 6,718,516 B1 | 4/2004 | Claussen et al. | | |
| 6,744,450 B1 * | 6/2004 | Zimniewicz | ............. | G06F 8/61 715/825 |
| 6,785,882 B1 | 8/2004 | Goiffon et al. | | |
| 6,789,251 B1 | 9/2004 | Johnson | | |
| 6,948,152 B2 | 9/2005 | Dubovsky | | |
| 6,981,212 B1 | 12/2005 | Claussen et al. | | |
| 6,990,653 B1 | 1/2006 | Burd et al. | | |
| 7,020,867 B2 | 3/2006 | Underseth et al. | | |
| 7,092,958 B2 | 8/2006 | Hempstead et al. | | |
| 7,136,868 B2 * | 11/2006 | Sonkin | ............. | G06F 8/30 707/754 |
| 7,137,100 B2 | 11/2006 | Iborra et al. | | |
| 7,149,734 B2 | 12/2006 | Carlson et al. | | |
| 7,251,812 B1 * | 7/2007 | Jhanwar | ............. | G06F 8/65 713/100 |
| 7,278,130 B2 | 10/2007 | Iborra et al. | | |
| 7,877,421 B2 * | 1/2011 | Berger | ............. | G06F 17/30604 707/602 |
| 8,381,207 B2 | 2/2013 | Asare | | |
| 9,256,415 B2 | 2/2016 | Asare | | |
| 9,696,979 B2 | 7/2017 | Asare | | |
| 10,223,095 B2 | 3/2019 | Asare | | |
| 2001/0039655 A1 * | 11/2001 | Elledge | ............. | G06F 8/61 717/170 |
| 2003/0120665 A1 * | 6/2003 | Fox | ............. | G06F 17/30557 |
| 2004/0027379 A1 * | 2/2004 | Hong Huey | ............. | G06F 8/38 715/764 |
| 2004/0030993 A1 * | 2/2004 | Hong Huey | ............. | G06F 8/38 715/229 |
| 2004/0034853 A1 * | 2/2004 | Gibbons | ............. | G06F 8/61 717/174 |
| 2004/0078793 A1 * | 4/2004 | Bragulla | ............. | G06F 8/656 717/174 |
| 2004/0093344 A1 * | 5/2004 | Berger | ............. | G06F 17/30557 |
| 2004/0250234 A1 * | 12/2004 | Liu | ............. | G06F 11/3612 717/101 |
| 2004/0255291 A1 * | 12/2004 | Sierer | ............. | G06F 8/61 717/174 |
| 2005/0091227 A1 * | 4/2005 | McCollum | ............. | G06F 8/36 |
| 2005/0120344 A1 * | 6/2005 | Asare | ............. | G06F 8/61 717/174 |

* cited by examiner

SCRIPT GENERATION ENGINE AND MAPPING SEMANTIC MODELS FOR TARGET PLATFORM

CROSS-REFERENCE TO RELATED APPLICATIONS

This application is a Continuation of U.S. patent application Ser. No. 15/610,569, filed May 31, 2017 which is a Continuation of U.S. patent application Ser. No. 14/991,919, filed Jan. 9, 2016, which is a Continuation of U.S. patent application Ser. No. 13/763,935, filed Feb. 11, 2013, which is a Divisional of U.S. patent application Ser. No. 10/725,728, filed Dec. 2, 2003, now U.S. Pat. No. 8,381,207, the entirety of which are incorporated herein by reference.

BACKGROUND OF THE INVENTION

Statement of the Technical Field

The present invention relates to the field of application component distribution, and more particularly to the target platform neutral management of application component requirements during the installation of an application component.

Description of the Related Art

Though often overlooked, application installation is a prerequisite to interacting with a software application. Specifically, in most circumstances, an application can be properly executed only subsequent to the completion of a successful installation process. At the minimum, a typical software application installation requires a transfer of files to the file structure of a computing system, and the configuration of the computing system to particularly interact with the software application. Ordinarily, the configuration of the computing system includes the addition or modification of registry settings, the addition or modification of entries to one or more initialization files, or both.

In the context of an application installation meant to upgrade the components of an application, oftentimes, simply replacing application out-dated versions of application components with newer versions of components will not alone suffice as a complete application upgrade. Rather, in an era of code re-use, shared libraries, and interdependent program objects, replacing a single application component can have a dramatic effect upon other separate, but independent applications. Common disastrous consequences include altered and now incompatible application programming interfaces (APIs), re-positioned application objects, and removed application objects. In all cases, an application dependency can be broken simply by upgrading the application components of another, unrelated application.

Whereas application component upgrades can be problematic generally, in an autonomic system, the problem can be particularly acute. For the uninitiated, autonomic computing systems self-regulate, self-repair and respond to changing conditions, without requiring any conscious effort on the part of the computing system operator. To that end, the computing system itself can bear the responsibility of coping with its own complexity. The crux of autonomic computing relates to eight principal characteristics:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.

Thus, in keeping with the principles of autonomic computing, the installation of application components must not only account for the seamless installation and configuration of the application components, but also the impact of the installation upon existing applications in the target platform. Moreover, it can be important that dependencies required for the nominal operation of the application components exist within the target platform, or can be accessed from the target platform. Finally, it can be critical that the infrastructure provided by the target platform, including its computing resources, meets the resource requirements of the application components. Hence, it will be of paramount concern to the autonomic system that the target platform itself will not become "broken" in consequence of the installation of the application components.

Presently, several application upgrade strategies exist. One such well-known strategy includes the venerable "ReadMe" file. In this strategy, software developers provide a list, typically as standard prose, of components in the application which are to be installed, the required prerequisite components and any resource requirements to be provided by the target platform. Subsequently, during installation, an application administrator can peruse the contents of the list to determine the nature of the component installation. As it will be recognized by one skilled in the art, however, the creation and use of a conventional ReadMe file can be both tedious and unreliable.

It will also be well understood by those skilled artisans that automated methods exist at least to remediate the tedium associated with the conventional ReadMe file. Specifically, various programming tools have been developed through which application component dependencies can be identified among system elements. Prior to any installation effort, the programming tool can be executed so as to determine the risk of undertaking the application installation. Still, this process lacks the granularity necessary to definitively assess the changing nature of dependencies. Moreover, modern automated methods are target platform specific. As a result, modern automated methods remain product level solutions which are ill-suited for the "write once run anywhere" nature of modern enterprise computing.

SUMMARY OF THE INVENTION

The present invention addresses the deficiencies of the art in respect to application component distribution and provides a novel and non-obvious method, system and apparatus for generating a target specific installation script for installing an application component from a platform neutral semantic model for the application component.

In a preferred aspect of the invention, an application component distribution system can include a repository of semantic models for interdependent ones of application components. A mapping of individual listings in the semantic models to target platform specific installation instructions further can be included. Finally, a script generation engine can be configured to produce a target specific set of instructions for a specified application component based upon a mapping of at least one of the semantic models in the repository. Notably, each of the semantic models can include a listing of component relationships, target platform requirements and platform neutral installation instructions. Moreover, the component relationships can include, but are not limited to at least one component relationship selected from the group consisting of a containment relationship, a usage relationship, a contradiction relationship, and an equivalence relationship. Finally, a Web services interface to the repository can be configured to permit remote access to the repository.

A script generation engine can be configured for use in either a standalone mode, for instance from fixed media, or in a network mode through an application component distribution system. The script generation engine can include a communicative coupling to a repository of semantic models for interdependent ones of application components configured for installation in a target platform. A mapping of individual listings in the semantic models to specific installation instructions for specific target platforms further can be provided, as can a script composition processor programmed to produce a specific set of instructions for installing a specified one of the interdependent application components in a specified one of the target platforms based upon the mapping. Importantly, each of the semantic models can include, but are not limited to, a listing of component relationships, target platform requirements and platform neutral installation instructions. In this regard, the component relationships can include, but are note limited to, at least one component relationship selected from the group consisting of a containment relationship, a usage relationship, a contradiction relationship, and an equivalence relationship.

In a method for generating an installation script for installing an application component to a specific target platform, the method can include retrieving a semantic model for the application component from a communicatively coupled repository of semantic models. A set of dependent components required to be present in the specific target platform can be determined from the semantic model. Moreover, a set of resource requirements required to be met by the specific target platform further can be determined from the semantic model. Finally, the set of dependent components and the set of resource requirements can be mapped into platform specific instructions in a platform specific installation script.

Notably, a set of platform neutral installation operations further can be determined from the semantic model. Consequently, the set of platform neutral installation operations can be mapped into the platform specific instructions as well. Preferably, a set of dependent components can be identified for the application component and a set of sub-dependent components can be identified for at least one of the dependent components. These steps can be repeated for each dependent and sub-dependent component in a hierarchy of dependent components for the application component. Finally, the further determining step can include computing a composite set of resource requirements for the application component and for the set of dependent components.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a script generation system, method and apparatus for use within an application component distribution system. In accordance with the present invention, a model of a set of interdependent application components can be created to indicate the interdependencies there between. The model along with the target platform requirements can be recorded in a platform neutral format and stored within a component repository. Subsequently, the platform neutral format can be mapped to specific installation instructions in a target platform specific installation script for a subject application component for a specific target platform. In particular, the repository can be consulted to identify the target platform requirements for the subject application component and each dependency in the hierarchy of dependencies for the subject application component. In this way, prior to installing the subject application component, the composite target platform requirements can be evaluated within the script in advance as can the required dependencies within the target platform.

Figure 1:
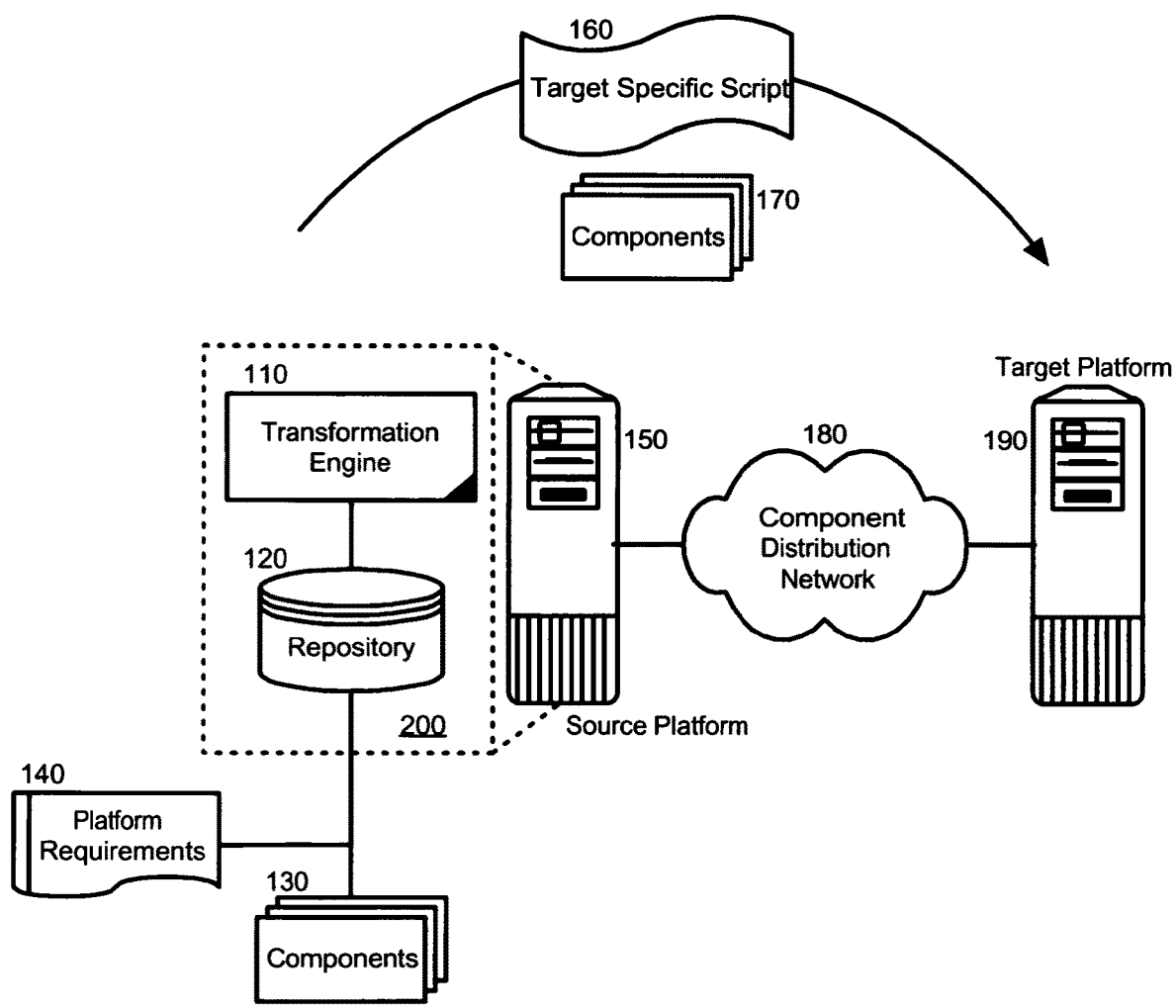
FIG. 1 is a schematic illustration of a script generation engine disposed within an application component distribution system.

FIG. 1 is a schematic illustration of a script generation engine disposed within an application component distribution system. The system can include a script generation engine 200 coupled to a source platform 150 configured for distributing subject application components 130 to individual target platform environments 190 over a component distribution network 180. In this regard, the target platform environments 190 can range from an operating system to an application hosted within individual application hosting environment, within a distributed and coordinated network of application hosting environments, or within a cluster of application hosting environments. Additionally, the component distribution network 180 can range from a simple Intranet to a complex data communications network.

The source platform 150 can be coupled to the components 130. The components can include application logic compartmentalized in one or objects which can operate within an execution environment such as a virtual machine. As it will be recognized by the skilled artisan, each of the components 130, can have specific resource requirements within the target platform 190, including a minimum amount of accessible memory, fixed storage and network bandwidth, to name a few. Additionally, each of the components 130 can depend upon the operation of one or more other components 130. For example, a Web application server can depend upon the operation of a database server, and a mail server can depend upon the availability of a data communications stack.

In as much as the components 130 can have both a set of target platform requirements and component dependencies, target platform requirements 140 can be recorded for each of the components 130 and stored within a repository 120 communicatively associated with the script generation engine 200. Preferably, the target platform requirements 140 can include deployment target requirements. The component dependencies, by comparison, can include a specification of the relationship between the components, including their respective ordering, any pre-requisite components required for the operation of other ones of the components, whether certain components are to be excluded from operation during the operation of other components, and equivalence among components such that one component can be interchanged for another.

Through the communicative association between the script generation engine 200 and the repository 120, the repository 120 can be accessed by a script generation process (not shown) in the script generation engine 200 based upon a specification of components. Within the repository 120, a model of functional dependencies between components 130 also can be stored. Preferably, the model along with the requirements can be formatted within a markup language with components specified according to their respective network addressing scheme. In this way, one familiar with the schema for the markup language document can readily parse the document to identify the hierarchical model of interdependent application components and their respective target platform requirements.

Significantly, a transformation engine 110 further can be communicatively associated with the script generation engine 200 and coupled to the repository 120. The transformation engine 110 can resolve mappings between the dependency relationships specified in the repository 120 and actual instructions (not shown) for installing a corresponding one of the components 130 in the target platform 190. Preferably, the transformation engine can generate a markup language formatted target specific script 160 for a selected set of components 170 to be installed in the target platform 190. The script 160 can include specific instructions for deploying the components 170 in the target platform 190. The instructions not only can identify pre-requisite minimum resources within the target platform 190, but also the script can identify dependencies required for the operation of the components 170, interchangeable ones of those dependencies, contradictions between the components 170 and already existing components in the target platform 190, and limitations on usage of one or more of the components 170.

Figure 2:
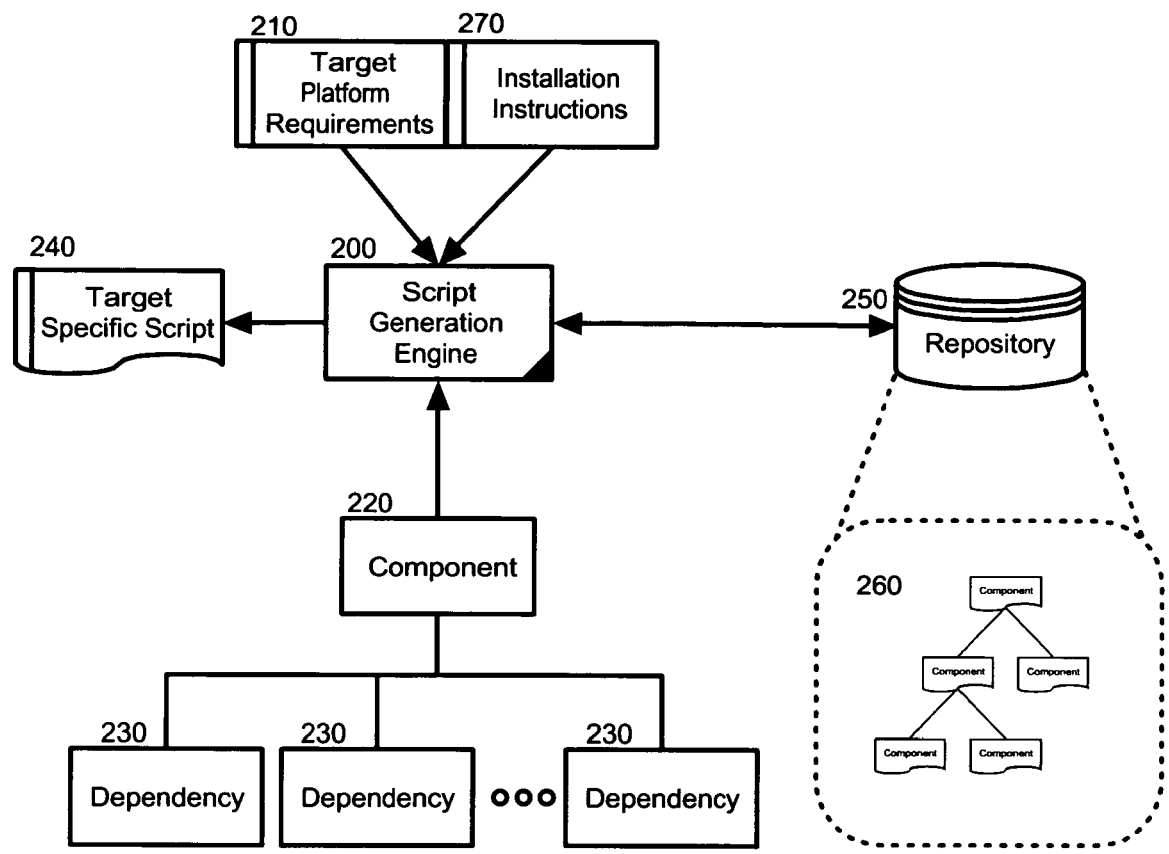
FIG. 2 is a block diagram illustrating the operation of the script generation engine of FIG. 1; and, FIG. 3 is a flow chart illustrating a process for generating an installation script for use in the application component distribution system of FIG. 1.

In further illustration, FIG. 2 is a block diagram illustrating the operation of the script generation engine of FIG. 1. As shown in FIG. 2, the script generation engine 200 can be communicatively linked to an application component 220 subject to the installation script generation process of the present invention. The application component 220 can depend upon one or more other components 230, referred to herein as "dependencies". In this regard, the set of components required for the operation of the component 220, including the component 220 itself, can be modeled as a hierarchy of components.

A set of target platform requirements 210 further can be specified for the application component 220. The target platform requirements 210 can include the minimum requisite type and level of resources required for the operation of the application component 220 within the target platform environment. Examples can include a minimal memory and fixed storage configuration, a minimum processor speed, minimum communications bandwidth and the like. A set of platform neutral installation instructions 270 also can be specified for the application component 210. The instructions can include, by way of example, the creation or copying of a directory or a file, the execution of a script, or the removal of temporary files. In any case, the script generation engine 200 can process the target platform requirements 210, the installation instructions 270 and the model of the component hierarchy into a platform neutral semantic model 260 specifying a set of installation instructions and target platform prerequisites. The semantic model 260 can be stored in a repository 250 for subsequent use.

Importantly, the semantic model 260 can describe the interdependent relationships among the components 220, 230. These relationships can include a containment relationship in which one component contains one or more sub-components which in of themselves can contain sub-components and so forth. These relationships further can include a usage relationship in which a specified component can be functional only in the presence of another component or components. These relationships yet further can include a contradictory relationship in consequence of which the installation of one component can disable the operation of one or more other components in the target platform in addition to any components which enjoy a usage relationship with the components in the target platform. Finally, these relationships can include an equivalence relationship in which two or more components can be considered interchangeable in terms of functionality.

It will be recognized by the skilled artisan that the semantic model 260 can remain platform independent in that the semantic model can be a markup language document specifying the relationships through the use of markup language tags defined within a document type definition, and wherein individual components can be referenced within tags by way of a uniform identifier. When the application component 220 is to be installed to a specific target platform, the semantic model 260 can be retrieved from the repository 250 and transformed into platform specific installation instructions in a target specific script 240. Part of the platform specific installation instructions can include, of course, pre-installation assurances that the target platform can meet the pre-requisite target platform requirements 210 included in the semantic model 260.

Figure 3:
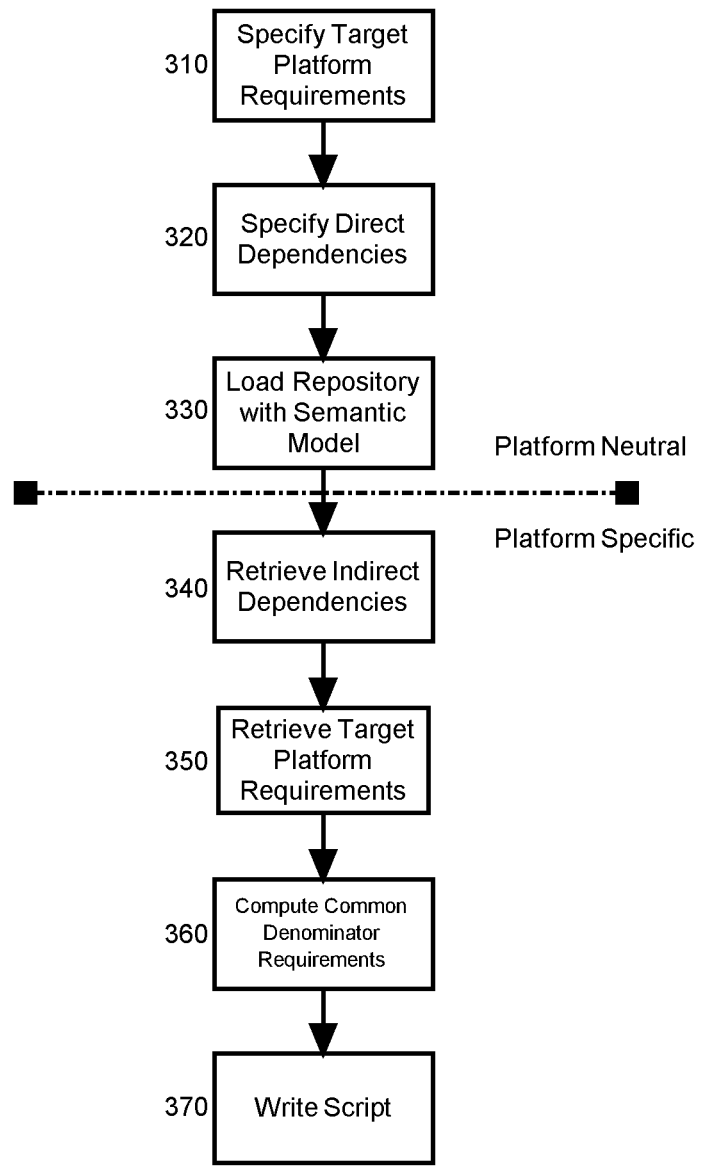

FIG. 3 is a flow chart illustrating a process for generating a platform specific target installation script for use in the application component distribution system of FIG. 1. First, prior to producing the platform specific script, a platform neutral semantic description of the installation must be created. In particular, in block 310, the target platform requirements can be specified. Subsequently, those components upon which the application component directly depends can be stored within a repository of platform neutral instructions for installing the application component.

Once the platform neutral installation instructions have been stored in the repository, on demand, the platform neutral installation instructions can be transformed to platform specific installation instructions for use in installing the application component to a specific target platform. In particular, in block 330 a connection can be established with the repository. In block 340, a set platform neutral installation instructions can be retrieved not only for the application component and its direct dependencies, but also a set of platform neutral installation instructions can be retrieved for those components which are indirectly required for the operation of the application. An example of an indirect dependency in this respect can include those components upon which a dependency of the application component depends.

In any case, the target platform requirements for the application component, the direct dependencies, and the indirect dependencies can be retrieved from the repository in block 350. Importantly, it will be recognized that the target requirements for some of the dependencies and sub-dependencies may vary so that the computing resources of a target platform may satisfy the requirements of some of the dependencies and sub-dependencies while the target platform may fail to satisfy the requirements of others of the dependencies and sub-dependencies. Moreover, the very installation and operation of one the dependencies can consume the resources of the target platform required by others of the dependencies.

Consequently, in a preferred aspect of the invention, a greatest common denominator for each enumerated resource in the target platform can be computed for non-shared resources and, in general, a total anticipated consumption of the resources can be computed. Subsequently, in block 370 each of the platform neutral instructions for installing each of the components, dependencies and sub-dependencies can transformed to a target specific listing of required dependencies, an order of installation, and other dependency relationships. Moreover, the target platform requirements further can be written to the target platform specific script. In both cases, the platform specific instructions can be formulated through a mapping of the platform neutral instructions in the repository.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for generating an installation script for installing an application component to a specific target platform, the method comprising the steps of:
   retrieving a semantic model for the application component from a communicatively coupled repository of semantic models for interdependent ones of application components, the semantic model including a set of individual listings comprising a listing of component relationships and a listing of target platform requirements specifying a minimum requisite type and a level of resources required for operation of the application component on a target platform;
   determining from the listing of component relationships from the set of individual listings in said semantic model, a set of dependent components upon which the application component depends that are required to be present in the specific target platform;
   further determining from the listing of target platform requirements from the set of individual listings in said semantic model, a set of resource requirements required to be met by the specific target platform;
   computing a total anticipated consumption of the resources required for operation of the application component on the target platform; and,
   mapping said set of dependent components and said set of resource requirements into platform specific instructions in a platform specific installation script.

2. The method of claim 1, further comprising the steps of:
   yet further determining from said semantic model a set of platform neutral installation operations; and,
   further mapping said set of platform neutral installation operations into said platform specific instructions.

3. The method of claim 1, wherein the determining step comprises the steps of:
   identifying a set of dependent components for the application component; and,
   further identifying a set of sub-dependent components for at least one of said dependent components.

4. The method of claim 3, further comprising the step of repeating the identifying and further identifying steps for each dependent and sub-dependent component in a hierarchy of dependent components for the application component.

5. The method of claim 1, wherein the further determining step comprises the step of computing a composite set of resource requirements for the application component and for said set of dependent components.

6. A non-transitory machine readable storage having stored thereon a computer program for generating an installation script for installing an application component to a specific target platform, the computer program comprising a routine set of instructions when executed cause the machine to perform the steps of:
   retrieving a semantic model for the application component from a communicatively coupled repository of semantic models for interdependent ones of application components, the semantic model including a set of individual listings comprising a listing of component relationships and a listing of target platform requirements specifying a minimum requisite type and a level of resources required for operation of the application component on a target platform;
   determining from the listing of component relationships from the set of individual listings in said semantic model, a set of dependent components upon which the application component depends that are required to be present in the specific target platform;

further determining from the listing of target platform requirements from the set of individual listings in said semantic model, a set of resource requirements required to be met by the specific target platform;

computing a total anticipated consumption of the resources required for operation of the application component on the target platform; and, mapping said set of dependent components and said set of resource requirements into platform specific instructions in a platform specific installation script.

7. The non-transitory machine readable storage of claim 6, further comprising the steps of:
yet further determining from said semantic model a set of platform neutral installation operations; and,
further mapping said set of platform neutral installation operations into said platform specific instructions.

8. The non-transitory machine readable storage of claim 6, wherein the determining step comprises the steps of:
identifying a set of dependent components for the application component; and,
further identifying a set of sub-dependent components for at least one of said dependent components.

9. The non-transitory machine readable storage of claim 8, further comprising the step of repeating the identifying and further identifying steps for each dependent and sub-dependent component in a hierarchy of dependent components for the application component.

10. The non-transitory machine readable storage of claim 6, wherein the further determining step comprises the step of computing a composite set of resource requirements for the application component and for said set of dependent components.

11. A system for generating an installation script for installing an application component to a specific target platform, comprising:
a computer having at least one processor and a memory, the computer comprising program code that when executed causes the at least one processor of the computer to:
retrieve a semantic model for the application component from a communicatively coupled repository of semantic models for interdependent ones of application components, the semantic model including a set of individual listings comprising a listing of component relationships and a listing of target platform requirements specifying a minimum requisite type and a level of resources required for operation of the application component on a target platform,
determine from the listing of component relationships from the set of individual listings in said semantic model, a set of dependent components upon which the application component depends that are required to be present in the specific target platform;
further determine from the listing of target platform requirements from the set of individual listings in said semantic model, a set of resource requirements required to be met by the specific target platform,
compute a total anticipated consumption of the resources required for operation of the application component on the target platform, and
map said set of dependent components and said set of resource requirements into platform specific instructions in a platform specific installation script.

* * * * *